Patented Nov. 8, 1932

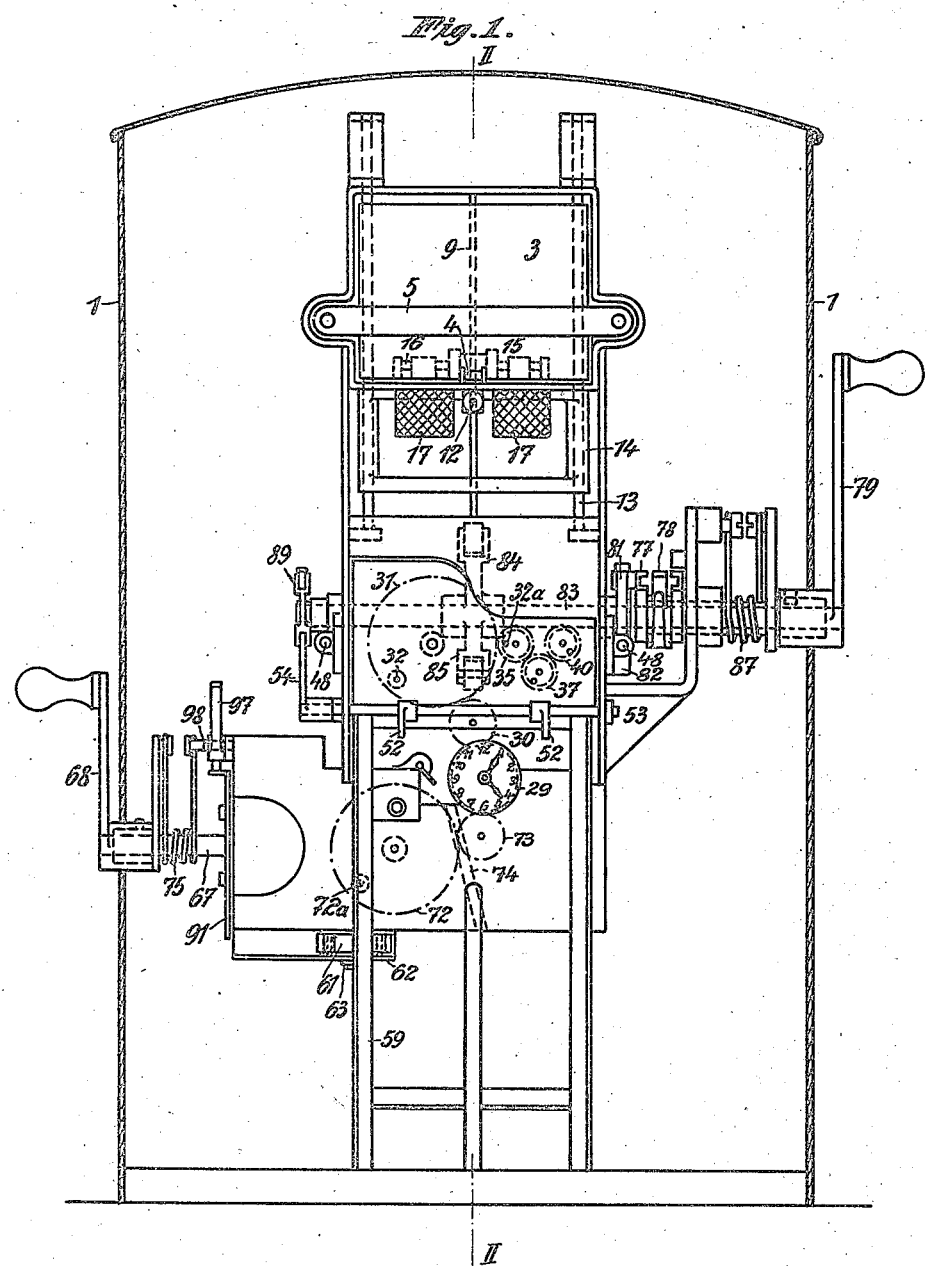

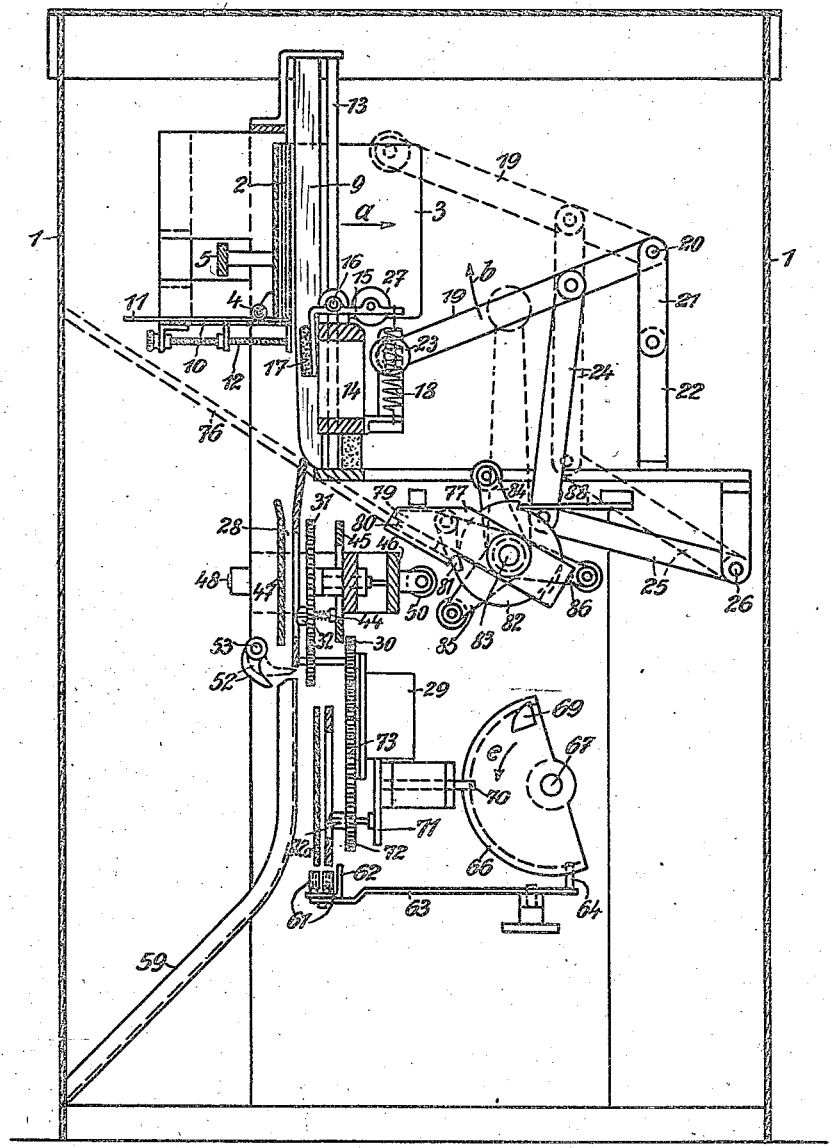

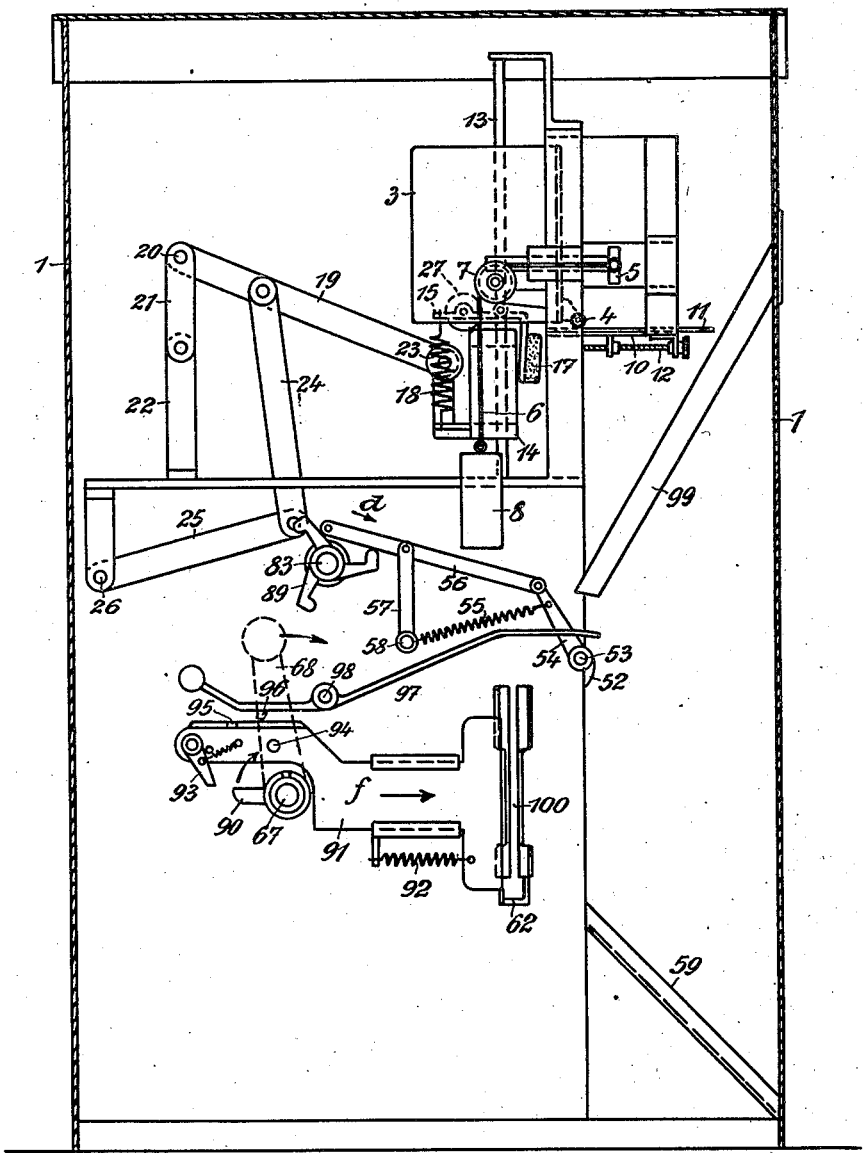

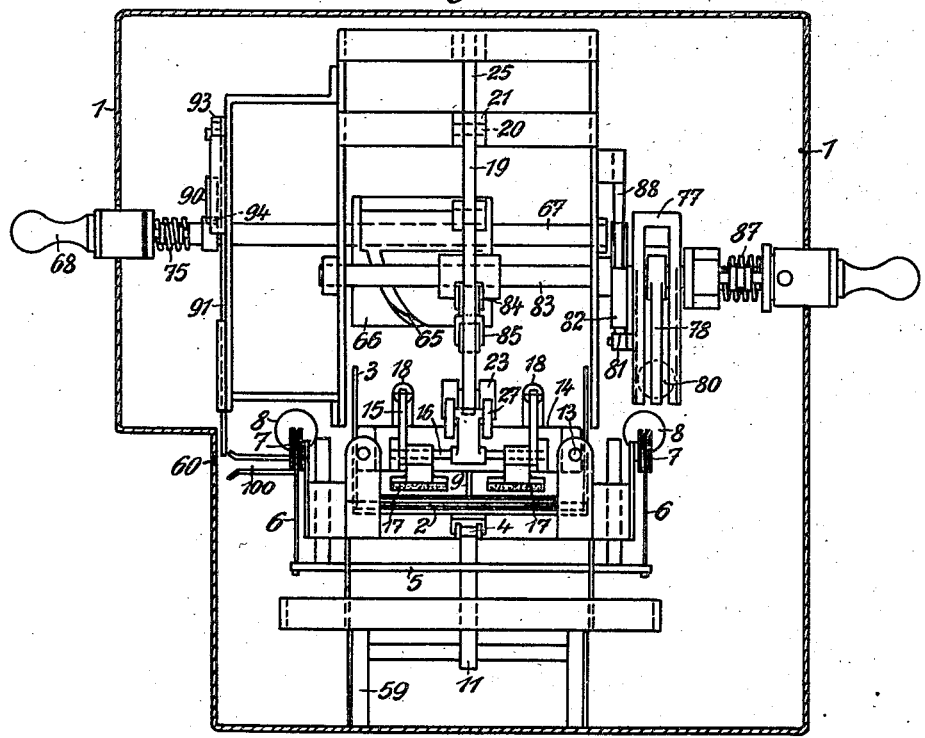

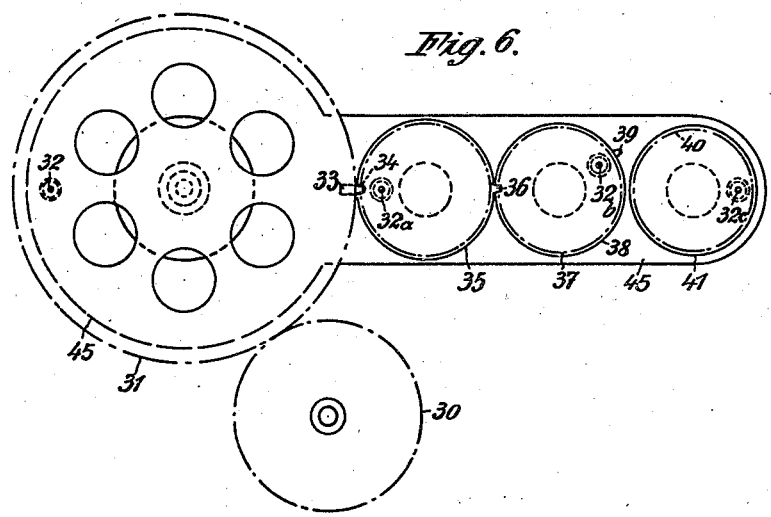
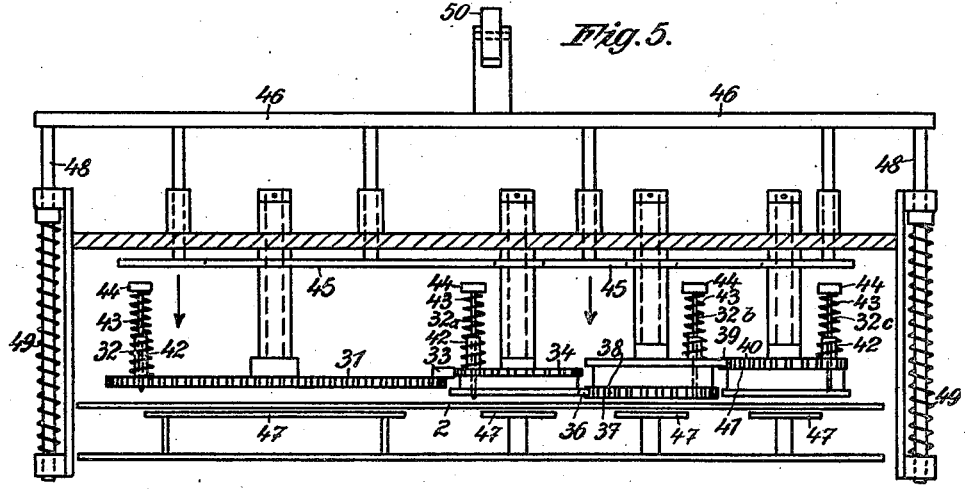

1,886,425

UNITED STATES PATENT OFFICE

LEO RAWITZKI, OF BERLIN, GERMANY

COIN-OPERATED VENDING APPARATUS

Application filed March 6, 1930, Serial No. 433,629, and in Germany March 7, 1929.

This invention relates to an automatic, coin-operated vending apparatus intended in the first place for issuing insurance policies and such similar or other papers or objects with which it is important to state and ascertain accurately the point of time at which the apparatus has been actuated. The chief characteristic feature of the present invention is this that it is equipped with a time marking device which states on a check that is to be inserted into the apparatus after this latter has issued the insurance policy or the like the point of time at which also this check had been inserted into the apparatus. Besides that time marking device, another time marking device is provided which states on the insurance policy or the like itself the point of time at which the apparatus has issued it, it being understood that the person who has actuated the apparatus keeps the policy in his portfolio or anywhere else. By providing a time marking device for a policy check that is to be inserted into the apparatus, especially an automatic, coin-controlled apparatus, after the respective apparatus has issued the respective policy, the person having actuated the apparatus in order to obtain a personal policy is prevented from transferring it later on to any other person; the check with the ascertainment of the time on it renders such transfer impossible.

Stating the time of issue merely upon the policy would not render a transfer impossible, as then the possibility remains that the person having taken out the policy transfers it at any time later on to another person who has met with an accident, but is not in possession of an insurance policy. As the policy does not bear the name of its holder, the name of the other person can then be written later on upon the check and this latter only now be inserted into the apparatus whereby a transfer would actually have been affected. As the point of time at which the check has been inserted into the apparatus cannot be ascertained by reason of the absence of a time marking device the insurance company is bound to acknowledge the insurance in spite of the forbidden transfer, of which the company knows nothing. Such is the state with an apparatus lacking the second time marking device, but matters are quite otherwise if such a second device is provided, as in the present invention. There are now two statements of time, and a certain short gap of time, say, a few minutes, is allowed to exist between the two statements. In that gap of time the insurance holder has to write his name and address upon the check which then he has to re-insert into the apparatus in order to have it provided with the second statement of time. That short gap of time is obviously insufficient in order to effect a transfer to another person having met with an accident just at this time. That is practically quite out of the question.

The improved automatic, coin-controlled vending apparatus is illustrated diagrammatically and by way of example on the accompanying drawings, on which Fig. 1 is a front-view of an apparatus designed according to this invention; Fig. 2 is a vertical section in the plane II—II of Fig. 1; Fig. 3 is a section similar to that of Fig. 2, but showing the parts now visible from the other side, viz. from the left to the right; Fig. 4 is a plan of the mechanism in the interior of the casing; Fig. 5 is a horizontal section through the time stamping device; Fig. 6 is a front-view of the device; Fig. 7 is a representation of a card comprising the insurance policy proper and the check; Fig. 8 shows certain details constituting a guiding device for the check; and Fig. 9 shows likewise certain details by which the proper position of the check when being re-inserted into the apparatus is ensured.

Referring to Figs. 1–4, 1 denotes the casing, in the upper part of which the insurance policies 2 are located. They lie one upon the other in vertical position, and they are held in this position by means of a U-shaped frame 3 having vertical guideways which are engaged by the vertical rims of the policies. The frame 3 is movable upon a roll 4 perpendicularly with respect to the planes of the policies. At the rear of the frame 3 is provided a transverse traverse 5, to the ends of which cords 6 are attached. These cords extend first horizontally in the direction to the front of the apparatus, are then guided into vertical direction by guide rolls 7, and are at their free end provided with weights 8 which continually tend to draw the frame 3 forward so as to press the policies upon another and to shift them forwardly when one of them has been withdrawn. The arrow *a* (Fig. 2) indicates the direction in which the weights 8 act upon the policies. In front of these latter is a stationary vertical traverse 9 against which the policies, more precisely the foremost of them, is pressed by the said weights.

The frame 3 is slidable upon a bottom 10 bearing a shiftable rod 11. The distance between the front edge of the traverse 9 and the front end of said rod 10 can be so adjusted by means of a screw 12 that only one policy, or policy card respectively can pass through the gap left between said ends, but that a certain friction arises while the card is passing through that gap, that friction being so determined that it is stronger than the force of gravity which tends to draw the card through the said gap.

In order to move downwards the foremost card of the horizontal pile 2, certain feeding means are provided; they consist of a slide 14 shiftable upon vertical rods 13 and bearing two bell-crank levers 15 which are turnable on pivots 16. The vertical arm of each of these levers is provided with a rubber covering 17 and the horizontal arm is subjected to the action of a spring 18, by which said rubber covering is pressed against the foremost policy card. The slide 14 is moved up and down by means of a mechanism comprising a lever 19 that is turnable on a pivot 20 projecting forth from a lever 21 hinged to a vertical support 22. The opposite end of the lever 19 is provided with a roll 23. Between this roll and the pivot 20 a rod 24 is hinged to the lever 19, and the other, i. e. lower, end of this rod is movably connected with an arm 25, these members 24 and 25 forming an angle one with another. The arm 25 is hinged to a stationary vertical member 26. The roll 23 can engage from below a pair of rolls 27 supported upon the slide 14.

When the lever 19 is moved in the direction indicated by the arrow *b* in Fig. 2, the roll 23 engages the rolls 27 and lifts the slide 14 together with the levers 15 and the rubber coverings 17. When the slide is rising the rubber coverings pass along the front surface of the foremost card without taking it along with them, but when the slide is descending, said coverings engage the foremost card and take it down with them through the gap between the members 10 and 11 so that said card falls finally into a channel 28 in which it is retained in a position in front of a time marking device presently to be described. The arrangement of the levers 15 is such that the friction between the rubber coverings mentioned and the front surface of the foremost card tends to turn the levers 15 in a direction in which the coverings are pressed against said card still stronger than before.

The object of the time marking device which is attached to the members forming the channel 28 is to mark upon that part of the policy card which remains in the hands of the person having bought a card the accurate point of time at which the buying has taken place. Said device is driven by the wheelwork of a clock 29 turning, by the intermediary of an intermediate wheel 30, a cog wheel 31 bearing a stamp pin 32 (Fig. 5). It is suited to the purpose to drive the wheel 31 in such a manner that it makes one complete revolution in 24 hours. The wheel 31 is provided with a projection 33 that can engage the teeth 34 of another cog-wheel 35. This wheel is provided with a stamp pin or marking pin 32$^a$. The projection or lug 33 turns the wheel 35 in steps; the arrangement is such that this wheel 34/35 makes one complete revolution in that time in which the wheel 31 makes 10 revolutions, so that the wheel 34/35 has been operated 10 times in that time. The marking pin 32$^a$ prints the digits of the day number of the year upon the policy. The wheel 34/35 has a lug 36 engaging the teeth 37 of another cog-wheel 38 provided with a marking or stamping pin 32$^b$. The wheel 37/38 is turned by a certain angle at every complete revolution of the wheel 34/35. Also in this case the ratio is such that the wheel 37/38 makes one complete revolution when the wheel 34/35 has made ten revolutions. The marking pin 32$^b$ stamps the tens of the respective day of the year. Finally the wheel 37/38 is provided with a lug 29 engaging the toothing 40 of a cog-wheel 41 bearing a marking pin 32$^c$ stamping upon the card the hundreds of the day in the respective year. Supposing, the policy has been bought on the 11th of July of the respective year, that is to say, on the 192nd day of that year, the marking pin 32$^a$ will stamp the 2, the marking pin 32$^b$ will stamp the 9, and the marking pin 32$^c$ will stamp the 1. In Figs. 5 and 6 the wheels concerned are arranged side by side, in a row, in order to show the arrangement and combination of the co-operating members more distinctly, but in reality I prefer to arrange the wheels concerned in the form of a triangle, as indicated in Fig. 1, in which these wheels are indicated by dotted lines.

Each of the marking pins 32, 32$^a$, 32$^b$ and 32$^c$ is shiftable in a bearing-forming sleeve 42 and is subjected to the pressure of a helical spring 43, bearing at its one end against the respective wheel and at its other end against a head 44 secured to the respective pin. In this position the pins are unactive, but they can be rendered active by means of a pressure plate 45 (Fig. 5) which is firmly connected with another plate or frame 46 connected in turn with shiftable pins 48. In Fig. 6 a plate 45 common to all pins 32 is shown, but instead thereof individual plates of circular or annular shape may be used for the individual pins. The plates 45 and 46 are held in their inactive position (Fig. 5) by helical compressive springs 49 arranged as shown in this figure. When the two plates mentioned are moved forwardly, viz. in the direction indicated by the arrow $c$, the plate 45 engages the marking pins and presses them against the insurance or other policy card located in front of them, and provides it at the places concerned with impressions or perforations indicating in their entirety the day of the year, as already stated, also by way of an example. The plate 46 is moved forwards by the intermediary of a roll 50 by means hereinafter described. In order to prevent the policy or policy card from giving way when the pins are pressed against it, a suitably located backing 47 is provided.

The policy or card to be stamped is held in proper position in the channel 28 with the aid of turnable lugs 52 (Figs. 2 and 3) affixed to a shaft 53. At one end of this shaft is provided a lever 54 which is subjected to the action of a spring 55. The upper end of the lever 54 is movably connected with a rod 56 supported also by a movable rod 57 hinged to a suitable part of the frame by means of a pin 58. The rod 56 is moved in the direction indicated by the arrow $d$ just prior to the policy card falling into the channel 28. Ordinarily, the projections 52 are in the position indicated by dotted lines in Fig. 2, but when the rod 56 is moved as just stated said projections get into the position drawn in full lines in Fig. 2, in which position they are located just below said channel and are able to retain the card therein. When then the stamping of the day of the year has been effected, the projections 52 are turned back into their former position and the card can now fall down into a delivery passage 59, by and through which it is delivered to the buyer.

In Fig. 5 a policy 2 is shown in its position ready to receive the time and day indications. It will be remembered from what has been explained in the preceding pages that not only the time of the respective day, but also the number of the day of the respective year is stated on the policy.

In order to facilitate the ascertainment of the day-time and the day, the policy is preferably provided a suitable imprint, for instance such as shown in Fig. 7, in which the policy or policy card has a circle of numerals indicating the 24 hours of a day. In the practical execution each of the 24 spaces is subdivided into smaller spaces of, say, 5 minutes, and laterally from this hour circle are three smaller circles $2^c$ $2^d$ $2^f$, each of which bears the numerals 0–9 by which the digits, the tens, and the hundreds indicating the day of the year, at which the policy has been bought (as already fully explained), are given.

It has already been stated that the apparatus is provided with two time marking devices, of which the second is intended to imprint the time upon a check forming a part of the policy and serving for preventing transfer of this latter to another person. The second time marking device is to be operated practically immediately after the first. Fig. 7 shows that the policy consists of a main portion bearing the numeral circles described in the preceding paragraph, and of an appendix $2^g$ which constitutes the check and bears a numeral circle $2^i$ corresponding with the numeral circle $2^b$ and being subdivided just in the same manner. In order to save space in the apparatus, the mechanism is so designed that the policies can be inserted into the frame 3 in folded state, each policy being folded along the line $2^k$ (Fig. 7), and the folded policies being so inserted into said frame that the numeral circles $2^c$ $2^d$ $2^f$ lie opposite the time marking pins, the check forming, therefore, the back of the folded policy.

The person having inserted a coin of the prescribed value into the slot and having received, or bought in this way, a policy purchaser writes his name and address into the free space between the circles $2^c$ $2^d$ $2^f$ and the circle $2^i$ and severs the check (which is solely the portion bearing the circle $2^i$, lefthand from the oblique dotted line $2^h$) from the main portion of the policy, whereafter he re-inserts the check (solely the check!) into the apparatus through a slot 60 (Fig. 4) provided especially for this purpose. When the check has been re-inserted in proper position (as will presently be described) into the appartus, its lower edge gets between two elastic cheeks 61 of a catch 62 actuated by a lever 63. One end of this lever engages, by the intermediary of a pin 64 (Fig. 2), the screw-shaped slot 65 of a semi-cylindrical control drum 66 (Fig. 4) which is affixed to a shaft 67 provided with a manually operable crank 68. Laterally from the drum 66 are cams 69 (Fig. 2) provided which co-operate with pins 70 affixed to a frame 71 designed like the frame 46 of Fig. 5. When the frame 71 is actuated by the cams 69 a pressure pin $72^a$ located in a toothed disk 72 is driven by means of an intermediate wheel 73 in such a manner that it performs a complete revolution in 24 hours. The manner in which said pressure pin is supported in the toothed disk 72 corresponds to the manner of supporting the pressure pin 32 in the toothed disk 31.

74 denotes an oblique abutment surface, the obliquity of which corresponds to the obliquity of the perforation $2^h$.

If a point of time is to be marked upon the check, the procedure is as follows: After the check has been inserted, or re-inserted respectively, into the apparatus and its lower edge has arrived between the clamping cheeks 61, the handcrank 68 is turned whereby a spring 75 will be put under tension; in consequence thereof the control drum 66 is turned in the direction indicated by the arrow e (Fig. 2) whereby the spiral-shaped groove 65 which co-operates with the pin 64 turns the lever 63 in such a direction and to such an extent that the oblique edge of the check is pressed firmly against the abutment surface 74. When then the drum 66 is further turned, the cheeks 61 slide along the lower edge of the check, as this is retained in its place by the abutment 74 and cannot, therefore, be moved. But prior to the cheeks 61 leaving the check, the cam 69 has come in contact with the rod 70 and has moved forward the frame 71, in consequence whereof the point of time at which this takes place will be marked upon the check. The crank 68 is, however, still further turned until the check has been disengaged from the catch 61 and can now fall down onto the bottom of the apparatus. Thereafter the crank is left to itself, and the spring 75 will turn it, as well as the drum 66 and the lever 63, together with the catches 61 and 62, back into their initial position.

The entire operation is initiated by throwing a coin into the slot provided for this purpose at the front side of the casing (the lefthand side of Fig. 2). The coin slides down along a chute 76 (Fig. 2) and arrives finally in a U-shaped coupling member 77 (Figs. 2 and 4). Between the legs of this member extends a tongue 78 which is affixed to the shaft of another manually operable crank 79. When the coin 80 (Fig. 4) has arrived between the members 77 and 78 these members will thereby be coupled with one another so that when the member 78 is turned also the member 77 will be turned. There is provided in this member a pawl 81 which co-operates with a ratchet-wheel 82 secured to a shaft 83. This shaft is also provided with three arms 84, 85 and 86, and the ratchet-wheel 82 is, in correspondence with said arms, provided with three teeth located with respect to one another under angles of 120°, which is true also of said three arms, as shown in Fig. 2.

Now, when the coin has coupled the members 77 and 78, the crank 79 is turned for about 120° whereby the spring 87 will be put under tension and the member 77 will take the member 78 round with it. Also the pawl 81 takes the ratchet-wheel 82 round with it whereby also the shaft 83 will be turned, and this shaft turns the arm-star 84, 85, 86. When the parts are in the position shown in Fig. 2, the rotation of the arm-star causes the following further movements: First the end of the arm 86 engages the knee formed by the levers 24 and 25 whereby the lever 24 is raised, the rod 19 is turned upwardly, and also the slide 14 is shifted upwardly. As soon as the arm 86 has so much been turned that its upper end leaves said knee, the lifted slide 14 falls under the action of the gravity and conveys by and during this movement an insurance policy, or a policy card respectively, into the channel 28. When the slide has, thus, fallen down, the rotary motion of the arm-star continues, and while this motion proceeds the arm 84 contacts with the roll 50 of the frame 46 of the time marking device, in consequence whereof this frame is moved forwards and the point of time at which this takes place is marked upon the policy in the manner already fully described in a preceding part of this specification.

At the end of the rotary movement of the arm-star also the front end of the arm 84 slides away over the roll 50 and the frame 46 is drawn back into its original position by the springs 49. When now the crank 79 is left to itself, also it is turned back into its former position by the spring 87, and also the members 77 and 78 return into their initial position. The pawl 81 slides away over the wheel 82 without taking it along with it, as this wheel is prevented from turning in that direction by the locking spring 88. The coin had left the members 77 and 78 when the return movement of the crank 86 had commenced.

For actuating the holding lugs 52 (Fig. 3) a triple cam 89 is provided upon the end of the shaft 83. Any one of the three cams can shift the rod 56 in the direction indicated by the arrow d in Fig. 3. With respect to the arm-star 84, 85, 86 the arrangement of said triple cam is such that the holding lugs 52 are in their holding position during that time in which a policy card is present in the channel 28 in order to receive the marking of the time. When this has been effected by the action of the arm-star upon the roll 50, that member of the triple cam which just has been active slides off from the rod 56, so that the spring 55 can move this rod back into the position shown in Fig. 3. The stamped or marked card is now no more held fast by the lugs 52 and, therefore, dropped into the channel 59.

It is suited to the purpose of the apparatus to provide means preventing actuation of the crank 68 if no policy has been bought, as well as means for closing the insertion slot 60 (Fig. 4) in such a case. These arrangements and combinations of parts comprise a locking cam 90 that is secured to the shaft 67 of the crank 68, and furthermore a plate 91 which is subjected to the action of a spring 92 and is connected with a locking lug 93, the position of which is such that it can lock the cam 90 of the shaft 67 of the crank 68, whereas the plate 91 can enter into the place behind the slot 60 in order to close this slot. The spring 92 tends to keep the plate 91 and the lug 93 in the position shown in Fig. 3 in which the crank 68 can be freely rotated and the slot 60 is open to receive the check portion of the policy. But as soon as the check has been thrown into said slot and the crank 68 is now turned, the cam 90 contacts with a pin 94 connected with the plate 91 and the lug 93, and this plate and the pawl 93 are now moved in the direction indicated by the arrow $f$ (Fig. 3) so that the slot 60 is closed. At the end of the movement of the crank 68 a locking member 95 engages a locking lug 96 projecting forth from a lever 97 supported on a pivot 98. After the member 95 has engaged the lug 96 at the rear thereof the disk 91 is prevented from being turned rearwardly by the spring 92 even if the crank 68 is moved back into its initial position by the spring 75. During this rearward movement the lug 90 of the shaft 67 slides behind the elastically supported locking lug 93 which also has been shifted in the direction indicated by the arrow $f$, so that another actuation of the crank 68 is prevented. The crank can be released and the slot be opened only when the lug 96 has released the locking member 95, whereafter the spring 92 can move the parts 91 and 93 back into the position shown in Fig. 3. The locking member 95 can be released, for instance, in this way that a coin or another object is thrown down into the chute 99 and falls upon the free end of the lever 97 whereby this lever will be turned and the lug 96 will be disengaged from the locking member 95. That other object may be, for instance, a pencil, the sectional shape of which corresponds to that of the slot in question and which may be delivered (by means not shown and not forming parts of this invention) together with the insurance policy. After that pencil has been used by the person concerned for writing his name and address upon the policy at the place therefor provided, it is also used for disengaging the locking members that have prevented an undue actuation of the time marking device provided for the check, as described.

Means have also been provided for preventing putting the check into the apparatus in a wrong position. It will be obvious that the time marking device provided for the check can act upon the numeral circle $2^i$ of the check in the proper manner only if the check is in the proper position, and for this purpose, first of all, the severing line $2^h$ is oblique, as shown in Fig. 7. Already the co-operation of the oblique edge $2^h$ (after it has been severed off from the policy proper) with the correspondingly oblique abutment member 74 can ensure the proper putting-in of the check, as otherwise this latter cannot be fully introduced into the apparatus. The respective person will, thus, perceive at once that he has made a fault, which appears distinctly from the fact that a part of the check remains outside the casing.

But nevertheless I have provided the separate device illustrated in Fig. 9 in which near the orifice of the channel 100 (Fig. 3) through which the check is to be introduced in order to be imprinted by the time marking device is provided a flap 101 which is turnable on an axle 102 and is kept, by a small weight 103, in a certain slight oblique position in which it forms an angle $\alpha$ with the vertical, this angle being smaller than the angle $\beta$ that determines the degree of the obliquity of the edge $2^h$. The axle 102 may be shifted counter to the action of a spring 104, and there is provided at it an abutment member 105 which when these parts are in the position shown in Fig. 9 can just pass in front of a stationary abutment member 106.

If the check $2^g$ is introduced into the slot 100 (Fig. 3) in its proper position, as in Fig. 9, first its lower corner $2^k$ pushes onto the lower end of the flap 101, and the turning moment exerted upon the flap is comparatively great by reason of the long lever-arm, but the transverse force in the direction of the slot or channel is only slight so that the flap is instantly swung upwards without a material shifting of the axle 102. Thus, the abutment member 105 passes in front of the abutment member 106 without touching it. If, however, the check has been introduced in wrong position, first any of the corners at the opposite rim, for instance the corner $2^m$ (Fig. 9), comes in contact with the flap 101, and now the lever-arm of the turning moment causing the lateral movement of the flap is only small. Consequently, the transverse force is comparatively great, so that the shaft 102 is moved counter to the action of the spring 104 in the direction indicated by the arrow $g$ before the flap has been turned by a perceptible angle. Owing to the shifting the abutment member 105 has been moved below the abutment member 106, in consequence whereof the flap 101 is prevented from a lateral oscillation and prevents in turn the check from being shoved into the channel behind the slot. This is, of course, a distinct indication that the check has been introduced in wrong position, must be withdrawn, and reversed.

I claim:

1. An automatic vending apparatus, comprising, in combination, coin-controlled means for releasing the article next to be delivered, as well as a check; a time marking device indicating upon said article the point of time of its delivery, means for receiving the check, another time marking device indicating upon said check the time of its delivery into the apparatus after the delivery of the said article therefrom, and a clockwork to operate said two time marking devices.

2. An automatic vending apparatus, comprising, in combination, coin controlled means for releasing the article next to be delivered as well as a check intended to be re-introduced into the apparatus after the delivery of the article, a time marking device adapted to indicate upon said article the point of time of its delivery, means for receiving the check, another time marking device adapted to indicate upon said check the point of time of its delivery to said receiving means, and a clockwork to operate said two time marking devices substantially as set forth.

3. An automatic vending apparatus, comprising, in combination, coin-controlled means for releasing the article next to be delivered, as well as a check intended to be re-introduced into the apparatus after the delivery of the article, a time marking device adapted to indicate upon said article the point of time of its delivery, means for receiving the check, another time marking device adapted to indicate upon said check the point of time of its delivery to said receiving means, and a clock-work to operate said two time marking devices.

4. An automatic vending apparatus, comprising, in combination, coin-controlled means for releasing the article next to be delivered, as well as a check, a time marking device indicating upon said article the point of time of its delivery, means for receiving the check and another time marking device indicating upon said check the time of its delivery to said receiving means in the apparatus after the delivery of the said article, each time marking device comprising a printing pin adapted to be pressed against the object which is to receive the time indication, a rotary disk so arranged with respect to said pin as to be adapted to move it into proper position at the proper point of time, and means for turning said disk once in twenty-four hours.

5. An automatic vending apparatus, comprising, in combination, coin controlled means for releasing the article next to be delivered, as well as a check, a time marking device indicating upon said article the point of time of its delivery, means for receiving the check and another time marking device indicating upon said check the time of its delivery to said receiving means in the apparatus after the delivery of the said check and article from said apparatus, the first-mentioned time marking device comprising a rotary disk performing one revolution in twenty-four hours and serving for indicating the time of the delivery day of the article, and three additional rotary disks, the ratio of rotation of which is 1:10:100, one of said disks serving for indicating upon said article the digit of the day of the year of the delivery of said article, another serving for indicating upon the article the tens, and the third serving for indicating the hundreds of the respective day, clockwork means for rotating all said disks, and means for imprinting the several indications upon the said article.

6. An automatic vending apparatus, comprising, in combination, coin controlled means for releasing the article next to be delivered, as well as a check; a time marking device indicating upon said article the point of time of its delivery, means for receiving the check and another time marking device indicating upon said check the time of its delivery to said receiving means in the apparatus after the delivery of the said check and article from the apparatus, each time marking device comprising an axially shiftable printing pin adapted to be pressed onto the check which is to receive the time indication, supporting means upon which said pins can slide, a rotary disk so arranged with respect to said pin as to be adapted to move it into proper position at the proper point of time, and means for turning said disk once in twenty-four hours.

7. An automatic vending apparatus, comprising, in combination, coin-controlled means for releasing the article next to be delivered, as well as a check, a time marking device indicating upon said article the point of time of its delivery, means for receiving the check and another time marking device indicating upon said check the time of its delivery to said receiving means in the apparatus after the delivery of the said article and check from said apparatus, each time marking device comprising a printing pin adapted to be pressed against the object which is to receive the time indication, a rotary disk so arranged with respect to said pin as to be adapted to move it into proper position at the proper point of time, means for turning said disk once in twenty four hours, a plate so arranged with respect to said pin as to be adapted to shove it forward, and means for actuating said plate.

8. An apparatus for the automatic vending of flat articles stored in the form of a pile from which they are to be singly delivered, comprising, in combination, members forming a gap, the breadth of which corresponds to the breadth of one of said articles, coin-controlled means for conveying the articles singly into said gap; a time marking device adapted to indicate upon every article the time of its delivery; means for holding the article having passed through the said gap in a position in which said time marking device can act on it, means for actuating this device, and means for releasing the respective article thereafter.

9. An apparatus for the automatic vending of flat articles stored in the form of a pile from which they are to be singly delivered, comprising, in combination, a vertical ledge arranged in front of said pile and contacting with the foremost article, a U-shaped holder located behind the pile and pressing said foremost article against said ledge, means for pressing said holder against the pile, a horizontal ledge located below the pile, and being remote from the front edge of the said vertical edge by so much as corresponds to the breadth of one of said articles; coin-controlled means for conveying the articles singly into said gap; a time marking device adapted to indicate upon every article the time of its delivery; means for holding the article having passed through the said gap in a position in which said time marking device can act on it, means for actuating this device, and means for releasing the respective article thereafter.

10. An apparatus for the automatic bending of flat articles stored in the form of a pile from which they are to be singly delivered, comprising, in combination, members forming a gap, the breadth of which corresponds to the breadth of one of said articles, means for varying the width of said gap, and a screw for operating these means; coin-controlled means for conveying the article singly into said gap; a time marking device adapted to indicate upon every article the time of its delivery; means for holding the article having passed through the said gap in a position in which said time marking device can act on it, means for actuating this device, and means for releasing the respective article thereafter.

11. An apparatus for the automatic vending of flat articles stored in the form of a pile from which they are to be singly delivered, comprising, in combination, members forming a gap, the breadth of which corresponds to the breadth of one of said articles, coin-controlled means for conveying the articles singly into said gap; a time marking device adapted to indicate upon every article the time of its delivery; clockwork means for said time marking device, means for holding the article having passed through the said gap in a position in which said time marking device can act on it; a cam-star adapted to actuate said conveying means, as well as said time marking device, and means for releasing the respective article thereafter.

12. An apparatus for the automatic vending of cards stored in the form of a pile from which they are to be singly delivered, comprising, in combination, a time marking device for marking on every card the point of time of its delivery; clockwork associated with said time marking device, coin controlled means to deliver cards singly to said time marking device, hooks so arranged as to support every card while the time indication is made on it; means for releasing the card thereafter and means for delivering it out of the apparatus.

13. An apparatus for the automatic vending of cards stored in the form of a pile from which they are to be singly delivered, comprising, in combination, a time marking device adapted to mark on every card the point of time of its delivery; clockwork to operate said time marking device, coin-controlled means for delivering cards singly to said time marking device, hooks so arranged as to support every card while the time indication is made on it; a cam-star so arranged as to be adapted to actuate said time marking device; a shaft supporting said cam-star; another cam-star also affixed to said shaft and being so arranged relatively to said hooks as to be adapted to release them in the proper points of time; and means for delivering the cards thereafter, substantially as described.

14. An automatic vending apparatus, comprising, in combination, a casing with a slot, coin-controlled means for releasing the article next to be delivered, as well as a check, a time marking device indicating upon said article the point of time of its delivery, and another time marking device indicating upon said check the time of its delivery through said slot into the apparatus after the delivery of the articles, clockwork associated with said two time marking devices, means for closing said slot, and means for rendering said closing means inoperative.

15. An automatic vending apparatus, comprising, in combination, coin-controlled means for releasing the article next to be delivered, as well as a check, a time marking device indicating upon said article the point of time of its delivery, means for receiving the check, another time marking device indicating upon said check the time of its delivery into the receiving means of the apparatus after the delivery of the said article; clockwork associated with said two time marking devices, check conveying means so designed as to be adapted to move the check positively into the proper position for providing it with the time indication, substantially as set forth.

16. An automatic vending apparatus, comprising, in combination, coin-controlled means for releasing the article next to be delivered, as well as a check, a time marking device indicating upon said article the point of time of its delivery, means for receiving the check, another time marking device indicating upon said check the time of its delivery into the receiving means of the apparatus after the delivery of the said article; clockwork associated with said two time marking devices, check conveying means so designed as to be adapted to move the check positively into the proper position for providing it with the time indication, and an abutment member against which the said check is placed by said check conveying means, substantially as set forth.

17. An automatic vending apparatus, comprising, in combination, coin-controlled means for releasing the article next to be delivered, as well as a check, a time marking device indicating upon said article the point of time of its delivery, means for receiving the check, another time marking device indicating upon said check the time of its delivery into the receiving means of the apparatus after the delivery of the said article; clockwork associated with said two time marking devices, check conveying means to move the check positively into the proper position for providing it with the time indication, a cam disk to actuate said check conveying means, and said check time marking device, means for actuating said cam disk, and means for transmitting the motions from said cam disk to said means and device, substantially as set forth.

18. An automatic vending apparatus, comprising, in combination, coin-controlled means for releasing the article next to be delivered, as well as a check, a time marking device indicating upon said article the point of time of its delivery, means for receiving the check, another time marking device indicating upon said check the time of its delivery into the receiving means of the apparatus after the delivery of the said article; clockwork associated with said two time marking devices, check conveying means comprising two clamping cheeks for clamping fast one rim of the check, an abutment member against which the check is placed by said cheeks, and means for moving the cheeks further until they have left said check rim, substantially as set forth.

19. An automatic vending apparatus, comprising, in combination, a casing with a slot, coin-controlled means for releasing the article next to be delivered, as well as a check, a time marking device indicating upon said article the point of time of its delivery, and another time marking device indicating upon said check the time of its delivery into the apparatus through said slot, clockwork associated with said two time marking devices, check conveying means comprising two cheeks so arranged as to clamp fast one rim of the check, an abutment member against which the check is placed by said cheeks, and means for moving the cheeks further until they have left said check rim; means for locking simultaneously the said check conveying device, the check time marking device, and for closing the slot, substantially as described.

20. An automatic vending apparatus, comprising, in combination, a casing with a slot, coin-controlled means for releasing the article next to be delivered, as well as a check, a time marking device indicating upon said article the point of time of its delivery, and another time marking device indicating upon said check the time of its delivery into the apparatus through said slot, clockwork associated with said two time marking devices; check conveying means comprising two cheeks so arranged as to clamp fast one rim of the check, an abutment member against which the check is placed by said cheeks, and means for moving the cheeks further until they have left said check rim; means for locking simultaneously the said check conveying device, the check time marking device, and for closing the slot, the slot closing means comprising a slide adapted to be shoved behind said slot, a spring moving said slide, a pawl connected with the slide, and a lug engaged by said pawl when the slide is in its closing position, and a manually operable crank so connected with the mechanism for actuating the said check conveying device, as well as the time marking device, are actuated, and means for releasing said locking and closing means, substantially as set forth.

21. An automatic vending apparatus, comprising, in combination, a casing with a slot, coin-controlled means for releasing the article next to be delivered, as well as a check, a time marking device indicating upon said article the point of time of its delivery, and another time marking device indicating upon said check the time of its delivery into the apparatus through said slot, clockwork associated with said two time marking devices; check conveying means comprising two cheeks so arranged as to clamp fast one rim of the check, an abutment member against which the check is placed by said cheeks, and means for moving the cheeks further until they have left said check rim, means for locking simultaneously the said check conveying device, the check time marking device, and for closing the slot, the slot closing means comprising a slide adapted to be shoved behind said slot, a spring moving said slide, a pawl connected with the slide, and a lug engaged by said pawl when the slide is in its locking position, a manually operable crank so connected with the mechanism for actuating said check conveying device, and said time marking device, a double-armed lever adapted to release the slot slide and said crank and gravity means for actuating said double armed lever.

22. An automatic vending apparatus, comprising, in combination, a casing with a slot, coin-controlled means for releasing the article next to be delivered, as well as a check, a time marking device indicating upon said article the point of time of its delivery, and another time marking device indicating upon said check the time of its introduction through said slot into the apparatus after the delivery of the articles, clockwork associated with said two time marking devices, means for insuring the correct introduction of the check into said slot.

23. A policy vending machine comprising coin controlled means for delivering a policy having two sections, means for marking on one of said sections at the time of its delivery, means for receiving the other section which is redeposited in the machine, and means associated with said first named marking means for marking on said second section the time of redepositing.

In testimony whereof I affix my signature.
LEO RAWITZKI.